United States Patent [19]
Datta et al.
[11] 4,409,041
[45] Oct. 11, 1983

[54] AMORPHOUS ALLOYS FOR ELECTROMAGNETIC DEVICES

[75] Inventors: Amitava Datta, Madison; Lance A. Davis, Morristown; Nicholas J. DeCristofaro, Chatham; Jordi Marti, Randolph, all of N.J.

[73] Assignee: Allied Corporation, Morristown, N.J.

[21] Appl. No.: 286,918

[22] Filed: Jul. 29, 1981

Related U.S. Application Data

[63] Continuation-in-part of Ser. No. 191,475, Sep. 26, 1980.

[51] Int. Cl.[3] .............................................. C04B 35/00
[52] U.S. Cl. .............................. 148/31.55; 75/123 B; 75/123 L
[58] Field of Search .................. 148/31.55, 31.57, 121; 75/123 B, 123 CB, 123 L

[56] References Cited

U.S. PATENT DOCUMENTS

| | | | |
|---|---|---|---|
| 3,856,513 | 12/1974 | Chen et al. | 75/123 B |
| 4,036,638 | 7/1977 | Ray et al. | 75/123 B |
| 4,038,073 | 7/1977 | O'Handley et al. | 148/31.55 |
| 4,219,355 | 8/1980 | DeCristofaro et al. | 148/103 |
| 4,226,619 | 10/1980 | Hatta et al. | 148/122 |
| 4,249,969 | 2/1981 | DeCristofaro et al. | 148/121 |
| 4,264,358 | 4/1981 | Johnson et al. | 75/134 F |
| 4,298,409 | 11/1981 | DeCristofaro et al. | 148/121 |

OTHER PUBLICATIONS

Schaafrma et al., "Amorphous to Crystalline Transformation of $Fe_{80}B_{20}$", Physical Review B, vol. 20, No. 11, Dec. 1, 1979, pp. 4423–4430.
Metallic Glasses–Papers Presented at a Seminar of the Materials Science Division of American Society for Metals, Sep. 18 and 19, 1976, American Society for Metals, p. 31.

*Primary Examiner*—John P. Sheehan
*Attorney, Agent, or Firm*—Ernest D. Buff; Gerhard H. Fuchs

[57] ABSTRACT

An iron based, boron containing magnetic alloy having at least 85 percent of its structure in the form of an amorphous metal matrix is annealed in the absence of a magnetic field at a temperature and for a time sufficient to induce precipitation therein of discrete particles of its constituents. The resulting alloy has decreased high frequency core losses and increased low field permeability; is particularly suited for high frequency applications.

8 Claims, 4 Drawing Figures

D = PARTICLE DIAMETER d = INTERPARTICLE SPACING

AMORPHOUS ALLOYS FOR ELECTROMAGNETIC DEVICES

CROSS REFERENCE TO RELATED APPLICATIONS

This is a continuation-in-part of our co-pending application Ser. No. 191,475 filed Sept. 26, 1980.

BACKGROUND OF THE INVENTION

1. Field of the Invention

The invention relates to iron-boron base amorphous metal alloy compositions and, in particular, to amorphous alloys containing iron, boron, silicon and carbon having enhanced high frequency magnetic properties.

2. Description of the Prior Art

Investigations have demonstrated that it is possible to obtain solid amorphous materials from certain metal alloy compositions. An amorphous material substantially lacks any long range atomic order and is characterized by an X-ray diffraction profile consisting of broad intensity maxima. Such a profile is qualitatively similar to the diffraction profile of a liquid or ordinary window glass. This is in contrast to a crystalline material which produces a diffraction profile consisting of sharp, narrow intensity maxima.

These amorphous materials exist in a metastable state. Upon heating to a sufficiently high temperature, they crystallize with evolution of the heat of crystallization, and the X-ray diffraction profile changes from one having amorphous characteristics to one having crystalline characteristics.

Novel amorphous metal alloys have been disclosed by H.S. Chen and D.E. Polk in U.S. Pat. No. 3,856,513, issued Dec. 24, 1974. These amorphous alloys have the formula $M_aY_bZ_c$ where M is at least one metal selected from the group of iron, nickel, cobalt, chromium and vanadium, Y is at least one element selected from the group consisting of phosphorus, boron and carbon, Z is at least one element selected from the group consisting of aluminum, antimony, beryllium, germanium, indium, tin and silicon, "a" ranges from about 60 to 90 atom percent, "b" ranges from about 10 to 30 atom percent and "c" ranges from about 0.1 to 15 atom percent. These amorphous alloys have been found suitable for a wide variety of applications in the form of ribbon, sheet, wire, powder, etc. The Chen and Polk patent also discloses amorphous alloys having the formula $T_iX_j$, where T is at least one transition metal, X is at least one element selected from the group consisting of aluminum, antimony, beryllium, boron, germanium, carbon, indium, phosphorus, silicon and tin, "i" ranges from about 70 to 87 atom percent and "j" ranges from about 13 to 30 atom percent. These amorphous alloys have been found suitable for wire applications.

At the time that the amorphous alloys described above were discovered, they evidenced magnetic properties that were superior to then known polycrystalline alloys. Nevertheless, new applications requiring improved magnetic properties and higher thermal stability have necessitated efforts to develop additional alloy compositions.

SUMMARY OF THE INVENTION

In accordance with the present invention, there is provided an iron based boron containing magnetic alloy having at least 85 percent of its structure in the form of an amorphous metal matrix, the alloy is annealed at a temperature and for a time sufficient to induce precipitation of discrete particles of its induce precipitation of discrete particles of its constituents. Precipitated discrete particles of the alloy have an average size ranging from about 0.05 μm to 1 μm and an average interparticle spacing of about 1 μm to about 10 μm, and constitute an average volume fraction of the alloy of about 0.01 to 0.3. Annealing of the alloy is conducted in the presence of a magnetic field. However, it has been found that excellent magnetic properties are obtained at reduced manufacturing costs by annealing the alloy in the absence of a magnetic field. Preferably, the alloy is composed of a composition having the formula $Fe_aB_bSi_cC_d$ wherein "a", "b", "c", and "d" are atomic percentages ranging from about 74 to 84, 8 to 24, 0 to 16 and 0 to 3, respectively, with the proviso that the sum of "a", "b", "c" and "d" equals 100.

Further, the invention provides a method of enhancing magnetic properties of the alloy set forth above, which method comprises the steps of (a) quenching a melt of the alloy at a rate of about $10^{5°}$ to $10^{6°}$ C./sec to form said alloy into continuous ribbon; (b) coating said ribbon with an insulating layer such as magnesium oxide; (c) annealing said coated ribbon at a temperature and for a time sufficient to induce precipitation of discrete particles in the amorphous metal matrix thereof.

Alloys produced in accordance with the method of this invention are not more than 30 percent crystalline and preferably not more than about 15 percent crystalline as determined by X-ray diffraction, electron diffraction, or transmission electron microscopy.

Alloys produced by the method of this invention exhibit improved high frequency magnetic properties that remains stable at temperatures up to about 150° C. As a result, the alloys are particularly suited for use in energy storage inductors, pulse transformers, transformers for switch mode power supplies, current transformers and the like.

BRIEF DESCRIPTION OF THE DRAWINGS

The invention will be more fully understood and further advantages will become apparent when reference is made to the accompanying drawings, in which.

DETAILED DESCRIPTION OF THE INVENTION

The composition of the new iron based amorphous alloys, preferably consists essentially of 74 to 84 atom percent iron, 8 to 24 atom percent boron, 0 to 16 atom percent silicon and 0 to 3 atom percent carbon. Such compositions exhibit enhanced high frequency magnetic properties when annealed in accordance with the method of the invention. The improved magnetic properties are evidenced by high magnetization, low core loss and low volt-ampere demand. An especially preferred composition within the foregoing ranges consists of 79 atom percent iron, 16 atom percent boron, 5 atom percent silicon and 0 atom percent carbon.

Alloys treated by the method of the present invention are not more than 30 percent crystalline and preferably are about 15 percent crystalline. High frequency magnetic properties are improved in alloys possessing the preferred volume percent of crystalline material. The volume percent of crystalline material is conveniently determined by X-ray diffraction, electron diffraction or transmission electron microscopy.

The amorphous metal alloys are formed by cooling a melt at a rate of about $10^5$° to $10^6$° C./sec. The purity of all materials is that found in normal commercial practice. A variety of techniques are available for fabricating splat-quenched foils and rapid-quenched continuous ribbons, wire, sheet, etc. Typically, a particular composition is selected, powders or granules of the requisite elements (or of materials that decompose to form the elements, such as ferroboron, ferrosilicon, etc.) in the desired proportions are melted and homogenized, and the molten alloy is rapidly quenched on a chill surface, such as a rotating cylinder.

The magnetic properties of the subject alloys can be enhanced by annealing the alloys. The method of annealing generally comprises heating the alloy to a temperature for a time to induce precipation of discrete crystalline particles within the amorphous metal matrix, such particles having an average size ranging from about 0.05 to 1 μm, an average interparticle spacing of about 1 to 10 μm and constituting an average volume fraction of about 0.01 to 0.3%. The annealing step is typically conducted in the presence of a magnetic field, the strength of which ranges from about 1 Oersted (80 amperes per meter) to 10 Oersteds (800 amperes per meter). However, as noted hereinabove, excellent magnetic properties are obtained and manufacturing costs are reduced by annealing the alloy in the absence of a magnetic field.

Figure 1:
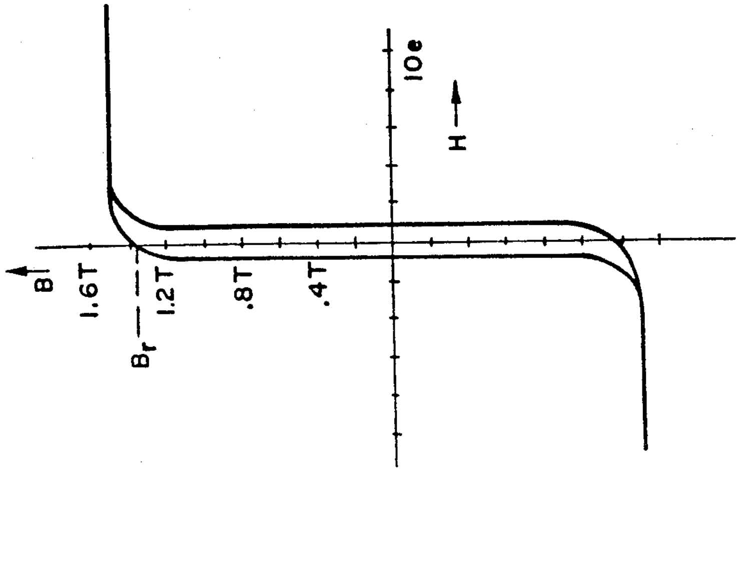
FIG. 1 is a graph showing the relationship between induction and magnetizing force for amorphous alloys in which precipitated discrete crystalline particles are absent.

It has been discovered that in the absence of discrete crystalline particles, amorphous alloys of this invention exhibit square d.c. B-H loops with high remnant magnetization ($B_r$); as in FIG. 1. Henceforth, square d.c. B-H loops will be referred to as Type A. Square loop material will yield large power losses at high frequencies.

Figure 2:
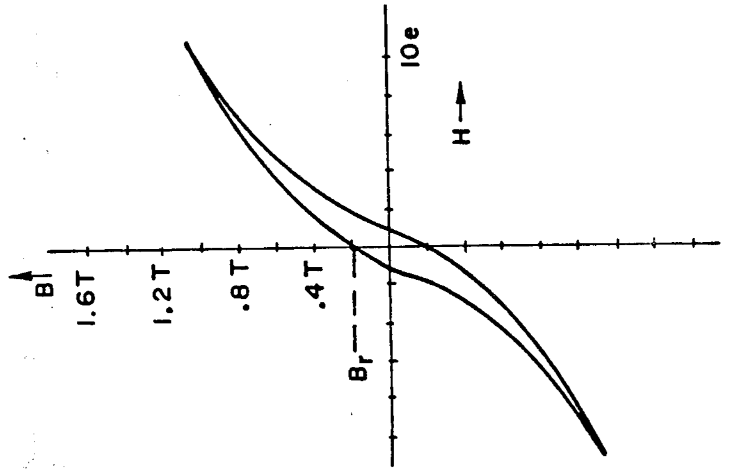
FIG. 2 is a graph showing the relationship between induction and magnetizing force for amorphous alloys of the present invention containing an optimum volume fraction of discrete particles.

At the optimum level of discrete crystalline particle density, the d.c. B-H loop is sheared with substantially reduced $B_r$, as in FIG. 2. Henceforth, sheared d.c. B-H loops will be referred to as Type B. Sheared loop material exhibits increased low field permeabilities and reduced core losses at high frequencies. Typically, the high frequency core loss of sheared loop material is approximately one-half the loss of square loop material. Lower core loss results in less heat build-up in the core and permits the use of less core material at a higher induction level for a given operating temperature.

Figure 3:
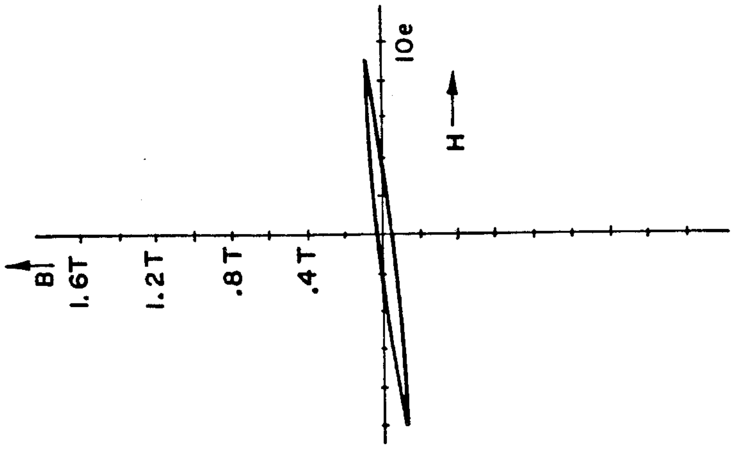
FIG. 3 is a graph showing the relationship between induction and magnetizing force for amorphous alloys of the invention containing a volume fraction of discrete particles larger than the optimum amount.

If the alloy is annealed to precipitate a volume fraction of discrete crystalline particles larger than the optimum amount, the d.c. B-H loop becomes flat with near zero $B_r$, as shown in FIG. 3. Henceforth, flat d.b. B-H loops will be referred to as Type C. The exciting power necessary to drive flat loop material is extremely large, reaching values up to ten times the exciting power of sheared or square loop material.

At high frequencies the dominant component of the total core loss is the eddy current loss, which decreases with the ferromagnetic domain size. By reducing the domain size, the high frequency core loss can be minimized. It has been found that the domain size can be reduced by controlled precipitation of discrete α-(Fe, Si) particles, which act as pinning points for the domain walls.

The extent to which core loss is minimized by controlled precipitation in accordance with the invention depends upon the interparticle spacing, volume fraction of the discrete particles and particle size of the precipitated phase. Because the particles act as the pinning points for the domain walls, the domain size is controlled by the interparticle spacing. Generally, the interparticle spacing should be of the same order of the domain size. Absent the presence of discrete particles, the domain size is too large, with the result that eddy current and core losses are excessive. However, too small an interparticle spacing results in very small domains and impedes the domain wall motion, raising the high frequency core loss. Preferably the interparticle spacing should range from about 2 to 6 μm.

Similarly, the extent to which core loss is minimized depends upon the alloy's volume fraction of discrete α-(Fe, Si) particles. When the volume fraction increases beyond 30%, the soft magnetic characteristics of the amorphous matrix begin to deteriorate and the crystalline α-(Fe, Si) particles offer excessive resistance to the domain wall motion. It has been found necessary to control the volume fraction of the discrete crystalline particles within a range of about 1–30%. The volume fraction is a function of the interparticle spacing and particle size. It has been found that the particle size preferably ranges from about 0.1 to 0.5 μm.

Figure 4:
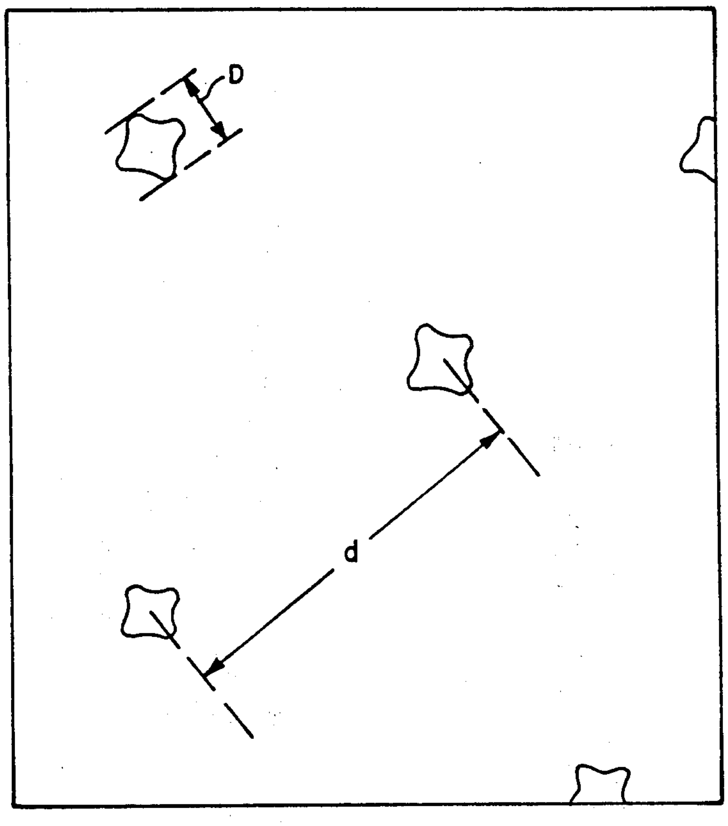
FIG. 4 is a schematic representation of an alloy of the invention, showing the distribution of discrete particles therein.

For amorphous alloys containing about 78 to 82 atom percent iron, 10 to 16 atom percent boron, 3 to 10 atom percent silicon and 0 to 2 atom percent carbon, torodial samples must be heated to temperatures between about 340° C. and 450° C. for times from about 15 minutes to 5 hours to induce the optimum distribution of discrete crystalline particles. The specific time and temperature is dependent on alloy composition and quench rate. For iron boron base alloys such as $Fe_{81}B_{13.5}S_{3.5}C_2$ and $Fe_{81}B_{14}S_5$, the discrete crystalline particles are star shaped, α- (Fe, Si) precipitates, as illustrated in FIG. 4. The precipitate size ranges from about 0.1 to 0.3 μm. The preferred average interparticle spacing (d) ranges from about 1.0 to 10. μm, corresponding to an optimum volume fraction of about 0.01 to 0.15. To calculate interparticle spacing from election micrographs, care must be taken to account for the projection of three dimensional arrays onto a two dimensional image.

Applications wherein low core losses are particularly advantageous include energy storage inductors, pulse transformers, transformers that switch mode power supplies, current transformers and the like.

As discussed above, alloys annealed by the method of the present invention exhibit improved magnetic properties that are stable at temperatures up to about 150° C. The temperature stability of the present alloys allows utilization thereof in high temperature applications.

When cores comprising the subject alloys are utilized in electromagnetic devices, such as transformers, they evidence low power loss and low exciting power demand, thus resulting in more efficient operation of the electromagnetic device. The loss of energy in a magnetic core as the result of eddy currents, which circulate through the core, results in the dissipation of energy in the form of heat. Cores made from the subject alloys require less electrical energy for operation and produce less heat. In applications where cooling apparatus is required to cool the transformer cores, such as transformers in aircraft and large power transformers, an additional savings is realized since less cooling apparatus is required to remove the smaller amount of heat generated by cores made from the subject alloys. In addition, the high magnetization and high efficiency of cores made from the subject alloys result in cores of reduced weight for a given capacity rating.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE I

Toroidal test samples were prepared by winding approximately 0.030 kg of 0.0254 m wide alloy ribbon of the composition $Fe_{81}B_{13.5}Si_{3.5}C_2$ on a steatite core having inside and outside diameters of 0.0397 m and 0.0445 m, respectively. The alloy was cast into ribbon by quenching the alloy on a chromium coated copper substrate. One hundred and fifty turns of high temperature magnetic wire were wound on the toroid to provide a d.c. circumferential field of up to 795.8 ampere/meter for annealing purposes. The samples were annealed in an inert gas atmosphere at temperatures from 365° C. to 430° C. for times from 30 minutes to 2 hours with the 795.8 A/m field applied during heating and cooling.

The average particle size, interparticle distance and volume fraction were measured by transmission electron microscopy. These parameters plus the 50 kHz, 0.11 power loss and exciting power are set forth in Table I as a function of the annealing parameters

TABLE I

Alloy: $Fe_{81}B_{13.5}Si_{3.5}C_2$

| Anneal Cycle. | D.C. B-H Loop Type | Particle Diameter | Inter-particle Spacing | Vol. Frac. | @ 50 kHz, .1T Core Loss | @ 50 kHz, .1T Exciting Power |
|---|---|---|---|---|---|---|
| 2 hr @ 365° C. with a 795.8 A/m circumferential field | Type A | No discrete particles in the amorphous matrix | | | 18 w/kg | 44 VA/kg |
| 2 hr @ 390° C. with a 795.8 A/m circumferential field | Type B | .2 μm | 3 μm | <15% | 6 w/kg | 26 VA/kg |
| 30 min. @ 430° C. with a 10 Oe circumferential field | Type C | .3 μm | .5 μm | >30% | 18.4 w/kg | 270 VA/kg |

EXAMPLE II

Toroidal test samples were prepared in accordance with the procedure set forth in Example I, except that the alloy was cast into ribbon by quenching the alloy on a Cu-Be substrate of higher conductivity than the substrate of Example I. The average particle size inter-particle distance, volume fraction, power loss and exciting power of the alloys are set forth in Table II.

TABLE II

Alloy: $Fe_{81}B_{13.5}Si_{3.5}C_2$

| Anneal Cycle | B-H D.C. Loop Type | Particle Diameter | Inter-particle Spacing | Volume Fraction | @ 50 kHz, .1T Core Loss | @ 50 kHz, .1T Exciting Power |
|---|---|---|---|---|---|---|
| 2 hr @ 390° C. with a 795.8 A/m circumferential field | Type A | No discrete particles in the amorphous matrix | | | 35 w/kg | 75 VA/kg |
| 1 hr @ 410° C. with a 795.8 A/m circumferential field | Type B | .2 μm | 4 μm | <15% | 5 w/kg | 28 VA/kg |
| 30 min @ 430° C. with a 398 A/m circumferential field | Type C | .3 μm-.5 μm | >2 μm | 30% | 16.6 w/kg | 287 VA/kg |

Toroidal test samples (hereafter designated Examples 3–4 were prepared in accordance with the same procedure set forth in Example II except that the composition of the alloy quenched into ribbon was $Fe_{81}B_{14}Si_5$ and $Fe_{78}B_{16}Si_5$, respectively.

Power loss and exciting power values for these alloys at 50 kHz and 0.1 T are set forth in Tables III and IV as a function of annealing temperatures.

TABLE III

Alloy: $Fe_{81}B_{14}Si_5$

| Anneal Cycle | D.C. B-H Loop Type | Particle Diameter | Inter-particle Spacing | Volume Fraction | @ 50 kHz 0.1T Core Loss | @ 50 kHz 0.1T Exciting Power |
|---|---|---|---|---|---|---|
| 1 hr @ 400° C. with a 398 A/m circumferential field | Type A | No discrete particles in the amorphous matrix | | | 25 w/kg | 34 VA/kg |
| 30 min @ 420° C. with a 398 A/m circumferential field | Type B | .2-.6 μm | >2 μm | <10% | 12 w/kg | 29 VA/kg |
| 30 min @ 450° C. with a 398 A/m circumferential field | Type C | .4-.7 μm | <.5 μm | >50% | Could not be measured as toroid needed extremely high exciting power | |

TABLE IV

Alloy: $Fe_{79}B_{16}Si_5$

| Anneal Cycle | D.C. B-H Loop Type | Particle Diameter | Interparticle Spacing | Volume Fraction | @ 50 kHz, 0.1T Core Loss | @ 50 kHz, 0.1T Exciting Power |
|---|---|---|---|---|---|---|
| 20 min @ 450° C. with a 398 A/m circumferential field | Type A | no discrete particles in the amorphous matrix | | | 23 w/kg | 29 VA/kg |
| 30 min @ 450° C. with a 398 A/m circumferential field | Type B | .3 μm | >3 μm | <5% | 9 w/kg | 21 VA/kg |
| 1 hr @ 450° C. with a 398 A/m circumferential field | Type C | .4 μm | >3 μm | >15% | 8 w/kg | 67 VA/kg |

EXAMPLE III

Toroidal test samples of alloy $Fe_{79}B_{16}Si_5$ were prepared in accordance with the procedure set forth in Example I, except that the alloy was cast into ribbon by quenching the alloy on a Cu-Be substrate of higher conductivity than the substrate of Example I. Also, unlike Examples I and II, test samples were annealed in the absence of a magnetic field. Microstructural characteristics namely, the average particle size, inter-particle distance and volume fraction remained substantially the same as shown in Table IV. Power loss and exciting power values for the alloy at 50 KHz and 0.1 T are set forth in Table V as a function of annealing conditions.

TABLE V

Alloy: $Fe_{79}B_{16}Si_5$

| Anneal Cycle | D.C. B-H Loop Type | @ 50 kHz, .1T Core Loss | @ 50 kHz, .1T Exciting Power |
|---|---|---|---|
| 3½ hr @ 420° C. | type A | 20 W/kg | 35 VA/kg |
| 4 hr @ 435° C. | type B | 10 W/kg | 20 VA/kg |
| 3½ hr @ 440° C. | type C | 13 W/kg | 42 VA/kg |

Having thus described the invention in rather full detail, it will be understood that this detail need not be strictly adhered to but that various changes and modifications may suggest themselves to one skilled in the art, all falling within the scope of the invention as defined by the subjoined claims.

We claim:

1. A magnetic alloy consisting essentially of iron, boron and silicon having at least 85 percent of its structure in the form of an amorphous metal matrix, said alloy having been annealed at a temperature and for a time sufficient to induce precipitation of discrete particles of its constituents in said amorphous metal matrix, said particles having an average size ranging from about 0.05 m to 1 m and an average interparticle spacing of about 1 m to 10 m, and constitute an average volume fraction of said alloy of about 0.01 to 0.3.

2. An alloy as recited in claim 1, wherein said alloy has been annealed in the presence of a magnetic field.

3. An alloy as recited in claim 1, wherein said alloy has been annealed in the absence of a magnetic field.

4. An alloy as recited in claim 3, wherein said discrete particles constitute an average volume fraction of said alloy of about 0.01 to 0.15.

5. An alloy as recited in claim 3, wherein said discrete particles have an average particle size of about 0.1 to 0.5 μm.

6. An alloy as recited in claim 3, wherein said average interparticle spacing of said discrete particles is about 2 to 6 μm.

7. An alloy as recited in claim 3, said alloy consisting essentially of a composition having the formula $Fe_aB_bSi_cC_d$, wherein "a", "b", "c", and "d" are atomic percentages ranging from about 74 to 84, 8 to 24, 0 to 16 and 0 to 3, respectively, with the proviso that "a", "b", "c" and "d" equals 100.

8. An alloy as recited in claim 2, said alloy consisting essentially of a composition having the formula $Fe_aB_bSi_cC_d$, wherein "a", "b", "c", and "d" are atomic percentages ranging from about 74 to 84, 8 to 24, 0 to 16 and 0 to 3, respectively, with the proviso that "a", "b", "c" and "d" equals 100.

* * * * *